United States Patent [19]

Borio et al.

[11] Patent Number: 4,476,790

[45] Date of Patent: Oct. 16, 1984

[54] METHOD OF FEEDING PARTICULATE MATERIAL TO A FLUIDIZED BED

[75] Inventors: Richard W. Borio, Somers; Stephen L. Goodstine, Windsor, both of Conn.

[73] Assignee: Combustion Engineering, Inc., Windsor, Conn.

[21] Appl. No.: 383,857

[22] Filed: Jun. 1, 1982

Related U.S. Application Data

[60] Division of Ser. No. 279,486, Mar. 20, 1981, abandoned, which is a continuation-in-part of Ser. No. 32,437, Apr. 23, 1979, abandoned.

[51] Int. Cl.$^3$ ............................................... F22B 1/00
[52] U.S. Cl. ..................................... 110/245; 222/637; 122/4 D; 110/220; 110/263
[58] Field of Search ................... 110/101 R, 111, 115, 110/267, 243–245, 263–265, 287, 288, 292, 293, 327, 220; 222/637; 406/89, 90; 122/4 D

[56] References Cited

U.S. PATENT DOCUMENTS 4,184,456  1/1980  Taylor ................................. 110/220
4,323,037  4/1982  Meyer-Kahrweg ................. 122/4 D

FOREIGN PATENT DOCUMENTS 2811995  9/1979  Fed. Rep. of Germany ...... 110/263
 800482  1/1981  U.S.S.R. ............................. 110/263

Primary Examiner—Henry C. Yuen
Attorney, Agent, or Firm—William W. Habelt

[57] ABSTRACT

A centrifugal spreader type feeder that supplies a mixture of particulate limestone and coal to the top of a fluidized bed reactor having a flow of air upward therethrough. Large particles of particulate matter are distributed over the upper surface of the bed to utilize the natural mixing within the bed, while fine particles are adapted to utilize an independent feeder that separates them from the large particles and injects them into the bed.

1 Claim, 2 Drawing Figures

METHOD OF FEEDING PARTICULATE MATERIAL TO A FLUIDIZED BED

The government of the United States of America has rights in this invention pursuant to contract No. EX-76-C-01-2473 awarded by the U.S. Energy Research and Development Administration.

BACKGROUND OF THE INVENTION

This application is a division of application Ser. No. 279,486 filed Mar. 20, 1981, abandoned, which is a continuation-in-part of application Ser. No. 032,437, filed Apr. 23, 1979, now abandoned.

This invention relates to fluidized bed type reactors as used for the combustion of pulverized coal in industrial or utility applications, and more particularly, to a method of feeding particulate material, particularly particulate fuel or a mixture of particulate fuel and particulate sulfur absorbent material, to the fluidized bed.

In conventional fluidized bed combustors, particulate fuel, usually coal, is burned in a bed of fluidized particulate material commonly including sulfur absorbent such as limestone and inert material such as ash. The bed is housed in a chamber, the floor of which is formed of a perforated or slotted plate. A fluidized gas is introduced into the bed upwardly through the floor of the chamber. The velocity of the fluidizing air is maintained above the minimum fluidization velocity so that the entire bed of particulate material is suspended or floated above the floor of the chamber.

In the conventional state-of-the-art method of feeding coal and/or other particulate material into the bed, the feed material is underfed to the bed through a standpipe which projects upwardly through the floor of the chamber into the fluidized bed. The coal merely overflows from the open top of the standpipe and is mixed into the bed via the turbulence inherently present in the fluidized bed. However, bed turbulence cannot be relied upon to laterally distribute feed material more than a few feet away from the feed point. Accordingly, it is conventional practice to provide one feed point, i.e., standpipe, for approximately each ten square feet of bed surface. For a coal-fired fluidized bed of 500 MW capacity, conceptual design studies have indicated that approximately 600 feed points may be required to provide an adequate mixing throughout an entire bed. Clearly, the provision of such a system is a complex and expensive undertaking, and a feed system not limited by poor lateral mixing would be desirable.

Such underbed feed techniques for feeding particulate material such as coal and sulfur absorbent into the fluidized bed presents some significant problems. If the coal is not evenly distributed throughout the bed, uneven combustion rates can result. Such uneven heat distribution can cause materials failure in the regions of excessive heat liberation and overcooling in regions of insufficient combustion. Additionally, uneven distribution of sulfur absorbent can result in significantly reduced overall sulfur retention in the bed and excessive discharge of sulfur oxides in the atmosphere.

Furthermore, if enough feed points are used to ensure even distribution of the coal and sulfur absorbent, the bed can become clogged with standpipes. As a result, proper fluidization of the bed is hindered with an attendant drop in bed turbulence and lateral mixing resulting.

One solution to this problem is to overfeed rather than underfeed particulate material to the bed. In overfeeding particulate material to a fluidized bed, the material is literally flung outwardly into the chamber by one or more feeders located in the wall of the chamber at an elevation above the top surface of the fluidized bed. The momentum imparted to the particles by the feeder carries the particles out over the surface of the bed with the force of gravity causing the particles to drop to the bed surface. Large particles because of their greater momentum as compared to smaller particles are carried further into the bed than the smaller particles thus providing a good lateral distribution of particles across the bed surface. Overbed feeders are capable of uniformly distributing particulate material over an area of approximately 100 square feet.

A major problem associated with such an overbed feed system is that fine particulate material is frequently entrained in the upwardly flowing combustion products evolving from the fluidized bed and subsequently carried out of the combustion chamber without ever having passed through the bed. Consequently, combustion efficiency and sulfur removal efficiency decrease as fine particulates of coal and absorbent are carried away. For effective sulfur retention, the sulfur dioxides must be formed in the bed as the coal burns in intimate contact with the particles of sulfur absorbent.

SUMMARY OF THE INVENTION

The present invention provides a method of feeding particulate material to a fluidized bed which achieves even distribution of the particulate material over the bed with a minimal loss of fines.

A bed of particulate material consisting of crushed coal and, preferably, a sulfur absorbent, such as ground limestone or dolomite, is fluidized in a portion of the air being supplied for combustion of the coal thereby establishing a fluidized bed. In accordance with the invention, a turbulent downflow region is established within the fluidized bed near the periphery thereof. To supply additional crushed coal and/or ground limestone or dolomite to the fluidized bed, the coarse particulate content thereof is directed across the surface of the fluidized bed, while the fine particulate content thereof is directed into the turbulent downflow region established within the bed.

In one mode of carrying out the method of the present invention, the fine particulate is separated from the coarse particulate after they have initially been fed together into the chamber housing the fluidized bed at a location above the surface of the bed, while in an alternate mode, the fine and coarse particulates are separated externally to the chamber and independently fed to the bed.

In the mode involving separation of the fines within the bed chamber, the mixed fine and coarse portions of the particulate feed material are projected across the surface of the bed from a location above the surface of the bed and adjacent the periphery of the bed wherein the turbulent downflow region is established. A curtain of high pressure downwardly directed air is established near the periphery of the bed such that the incoming particulate material must traverse the curtain as it is projected across the surface of the bed. In traversing the air curtain, the fine particulate material is entrained in the curtain and directed downwardly to the bed surface at the periphery thereof in the turbulent downflow region. The coarse particulate material penetrates the air curtain and is distributed across the surface of the bed.

In the mode involving separation of the fines externally of the chamber, the coarse and fine particulate feed material are first separated and then independently fed to the bed. The coarse material is projected across the surface of the bed from a location above the surface of the bed as in conventional overbed feeding. The fine material, however, is entrained in a stream of high pressure air and fed downwardly directly into the turbulent downflow region along the bed periphery at a location below the surface of the bed.

DESCRIPTION OF THE PREFERRED EMBODIMENT

Figure 1:
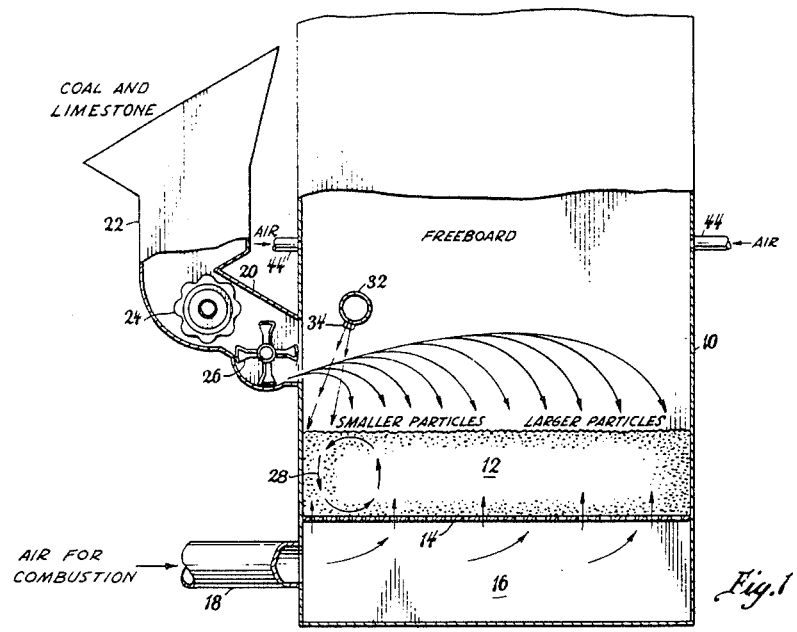
FIG. 1 is a vertical section of a fluidized bed reactor employing one mode of carrying out the present invention.

Referring to the drawing, there is shown a chamber 10 having a bed of discrete material 12 that is supported upon a horizontally disposed screen or perforated plate 14 to provide a lower plenum chamber 16. The chamber 16 has an inlet 18 for the supply of air for combustion from a suitable outside source for passage upward through the interstices of the plate 14 and the free area between the discrete fuel particles supported thereon.

The upward flow of air and the downward movement of particulate matter produces a circulation within the bed that thoroughly mixes all particles with the incoming fluidizing air. According to the present invention, downflow of particles within the bed is designed to be maximum near the perimeter of the housing so there will be a natural circulation of particles thereby establishing a turbulent downflow region 28 along the periphery of the fluidizing bed 12. To attain this pronounced downflow at predetermined areas of the bed, a portion of the perimeter of the distribution plate 14 is formed with fewer or smaller openings therethrough that tend to decrease the effect of upward moving air.

Above the surface of the bed 12 in a wall of the chamber 10, adjacent to the periphery of the bed 12 wherein the turbulent downflow region 28 has been established, an inlet 20 is provided through which the particulate material being fed to the bed can be projected across the surface of the bed. The coal and limestone are supplied from a source 22 to a rotary feeder 24 that supplies the fuel to a distributor 26 that, in turn, flings the granular material outward across the housing 10 to fall upon the top of the bed 12, the rotary feeder 24 being operated at a rate that is determined as necessary to carry the load of the boiler.

The particulate material falls in a continuous stream into the path of the revolving distributor wheel 26 that flings the particles outwardly over the bed. These blades are mounted in approximately four rows which are spaced apart, parallel to the axis of the distributor rotor. One set of rows preferably has the blades of the distributor set at an angle that throws the fuel to the right, while the next pair is set so the fuel will be thrown to the left. This criss-crossing of particulate fuel and limestone results in consistently uniform distribution of such granular material to the bed. The lateral distribution may be varied by adjusting the speed of rotation or the angularity with which the blades of the distributor are set. The distributor speed and angular setting of the blades are adjusted by means considered conventional in the art.

One of the characteristics of a rotary feeder/distributor of the type defined is the inherent classification of particles as they are flung out across the housing. Large particles of coal and limestone would be flung further away from the feeder/distributor because of their greater momentum as compared to smaller particles. However, if particles are too small, they will remain airborne due to the velocity of the combustion product gases rising through the bed and escaping thru the freeboard area above the bed, and subsequently to the atmosphere.

To ensure capture of the fine particulate material in the bed 12, the coarse particulate and fine particulate must be separated and the fines directed into the bed to be drawn into the turbulent downflow region 28 thereof before the fines become entrained in the gases evolving from the bed. The method of the present invention contemplates separation of the fines from the coarse particulate either internally of the chamber 10 after the homogenous mixture of fine and coarse particulate is fed into the chamber, or externally of the chamber 10 before the particulate material is fed to the bed 12.

To accomplish internal separation, the present invention contemplates establishing an air curtain which the incoming particulate feed must traverse as it is projected into the chamber. As shown in FIG. 1, there is provided, a header 32 with downward directed nozzles 34 over the inlet 20. The header is supplied with pressurized air whereby the air stream exhausting from nozzles 34 forms a curtain that impinges upon the airborne particulate matter being thrown by distriutor 26. By virtue of their lower momentum, the smaller particles (fines) will deviate from their original trajectory and be carried down to the bed before major devolatilization and/or entrainment in the product gas has occurred. The high pressure air curtain is directed downwardly so as to intersect the surface of the bed 12 at the periphery thereof wherein the turbulent downflow region 28 has been established. The fines carried to the bed in the air stream are drawn into the downflow and carried down into the bed for combustion therein. The high pressure air curtain also serves to enhance the formation of the downflow region 28 at the periphery of the bed.

Alternately, the fine particulate material can be separated from the coarse particulate material externally to the chamber 10 with the coarse material and fine material then being independently fed to the bed.

Figure 2:
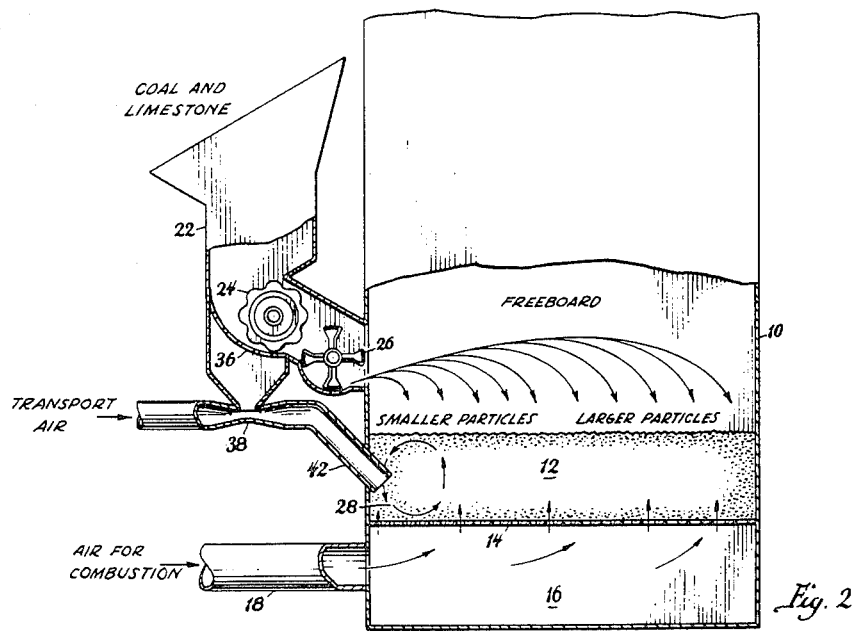
FIG. 2 is a vertical section of a fluidized bed reactor employing an alternate mode of carrying out the present invention.

One arrangement for separating the particulate coal and limestone involves integrating an arcuate classifying screen 36 and a rotary feeder in the manner shown by FIG. 2. The screen may be vibrated continuously by a conventional apparatus whereby the fines will drop through the screen 36 to the throat of a venturi 38 where they will be picked up by a stream of transport air supplied through duct 42 directly to the bed. To assure maximum reaction time for the fines, they are delivered to the fluidized bed 12 at a location below the surface into the downflow region 28. The end of duct 42 supplying the particles to the bed is bent down to insure a natural downward movement of the particles above the restricted portion of the distributor plate and enhance the establishment of the downflow region 28 within the bed 12.

To more thoroughly burn any combustible gases that have been generated by the devolatilization of coal in the freeboard area, and to burn unburned gases given off from coal in the bed itself, a source of tertiary combustion air may be introduced through tangential inlets 44 at spaced sides of the combustion chamber, above the incoming coal and limestone.

Because particulate coal is supplied to the upper surface of the bed where the oxygen content is significantly lower, the potential for $NO_x$ is greatly reduced. Moreover, the arrangement defined permits feeding large coal sizes that result in obvious economies of operation. Furthermore, the feeder may be made to respond quickly to a change in conditions as called for by any condition responsive device.

We claim:

1. A method of feeding additional particulate material into a fluidized bed of said particulate material established in a chamber above and supported upon a distribution plate having a plurality of holes formed therein, the bed fluidized by passing air upwardly through the distribution plate into said particular material, comprising the steps of:

a. providing the distribution plate with fewer or smaller holes adjacent to the perimeter of the distribution plate,
   b. selectively distributing the fluidizing air passing upwardly through the distribution plate so as to pass a lesser amount of the fluidizing air upwardly into the bed through said fewer or smaller holes thereby establishing a turbulent downflow region within the bed at the periphery thereof;
   c. separating the relatively fine particulate material from the relatively coarse particulate material in said feed material;
   d. projecting the separated relatively coarse particulate material outwardly into the chamber through an opening in the wall of the chamber located above the surface of the fluidized bed;
   e. entraining the relatively fine particulate material in a stream of air; and
   f. injecting the air stream with the relatively fine particulate material entrained therein directly into the turbulent downflow region established within the bed.

* * * * *